E. N. LIGHTFOOT.
FEEDER FOR MELTING POTS.
APPLICATION FILED MAY 21, 1917.

1,437,528.

Patented Dec. 5, 1922.
7 SHEETS—SHEET 1.

Fig. 1.

E. N. LIGHTFOOT.
FEEDER FOR MELTING POTS.
APPLICATION FILED MAY 21, 1917.

1,437,528.

Patented Dec. 5, 1922.
7 SHEETS—SHEET 4.

Fig. 5

E. N. LIGHTFOOT.
FEEDER FOR MELTING POTS.
APPLICATION FILED MAY 21, 1917.

1,437,528.

Patented Dec. 5, 1922.
7 SHEETS—SHEET 6.

E. N. LIGHTFOOT.
FEEDER FOR MELTING POTS.
APPLICATION FILED MAY 21, 1917.

1,437,528.

Patented Dec. 5, 1922.
7 SHEETS—SHEET 7.

Inventor
Edwin N. Lightfoot
By: Edwin B. H. Tower Jr.
Atty.

Patented Dec. 5, 1922.

1,437,528

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

FEEDER FOR MELTING POTS.

Application filed May 21, 1917. Serial No. 169,923.

*To all whom it may concern:*

Be it known that I, EDWIN N. LIGHTFOOT, a citizen of the United States, residing at New York, in the county of Bronx and State of New York, have invented new and useful Improvements in Feeders for Melting Pots, of which the following is a specification.

This invention relates to feeders for melting pots.

More particularly it relates to a feeder in which the metal is pre-heated before being fed into the melting pot.

One object of the invention is to provide an improved feeder for supplying molten metal to a melting pot.

Another object is to provide a feeder wherein the heat waste is reduced to a minimum.

Another object is to provide a feeder wherein the metal to be melted comes into direct contact with the heater.

Another object is to provide a feeder for using relatively small pieces or ingots of metal and wherein the heat is confined to the melting zone.

Another object is to provide a relatively stationary feeder for an oscillatory melting pot which will maintain the melting pot substantially closed during its oscillation.

Another object is to provide a relatively stationary feeder for an oscillatory melting pot which conforms in shape to the top of the melting pot to permit the movement of the pot to and from casting position.

Another object is to provide means for insuring that the heating means for the feeder will be rendered inoperative when the machine is first put in operation and during the period of preliminarily heating and melting the metal in the pot.

Another object is to provide means for feeding molten metal to the melting pot which will not tend to clog at the delivery opening.

Other objects will appear as the specification proceeds.

An embodiment of the invention is illustrated in the accompanying drawings in which:—

The feeder illustrated comprises a crucible which is mounted to swing to and from an operative position above the melting pot of a type casting machine When the crucible is in its operative position it is adapted to deliver molten metal into the melting pot. Metal pigs are fed into the crucible and are melted by an electric heater which is controlled by the level of the metal in the melting pot. When the level of the metal in the melting pot becomes low, the heater in the crucible of the feeder melts the metal from the lowermost pig or pigs and the melted metal flows into the pot. When the metal in the pot reaches the proper level the supply of current to the heater in the crucible is automatically cut off.

The bottom of the crucible of the feeder is made trough shaped and is provided in its lower portion with a discharge opening. The heater is also made trough shaped and rests in the trough shaped bottom of the crucible, but is spaced away from the bottom of the crucible for the purpose hereinafter described. The heater is provided with a discharge opening which overlies the discharge opening in the crucible but is adapted to discharge the molten metal directly into the pot without the metal coming in contact with the edge of the discharge opening of the crucible.

The switch for controlling the supply of current to the heater of the feeder is interlocked with the switch for controlling the supply of current to the heaters of the melting pot so that whenever current is being supplied to the heaters of the melting pot, current cannot also be supplied to the heater of the feeder. This renders it possible to melt the metal in the pot when the machine is first put in operation without allowing the feeder to operate. The feeder is not needed during this preliminary heating period and the interlocking of the switches therefore prevents waste of current. The interlocking of the switches also prevents flooding of the melting pot. If the interlock were not provided and the metal in the pot happened to be low when the machine was first put in operation the feeder might flood the melting pot as the float mechanism could not properly operate on account of the solid metal in the pot.

The feeder is illustrated in combination with a standard linotype pot but it will be understood that it may be used for feeding metal to the melting pot of any kind of a machine.

Figure 1:
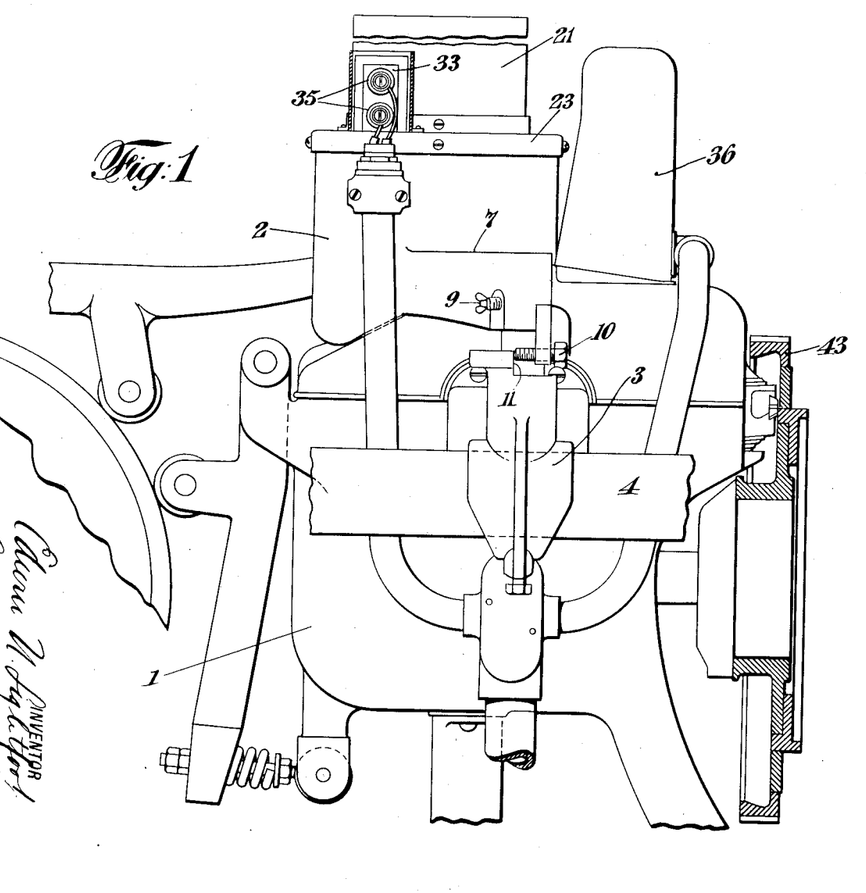
Fig. 1 is a side elevation of a melting pot of a type casting machine showing the feeder associated therewith.
Figure 2:
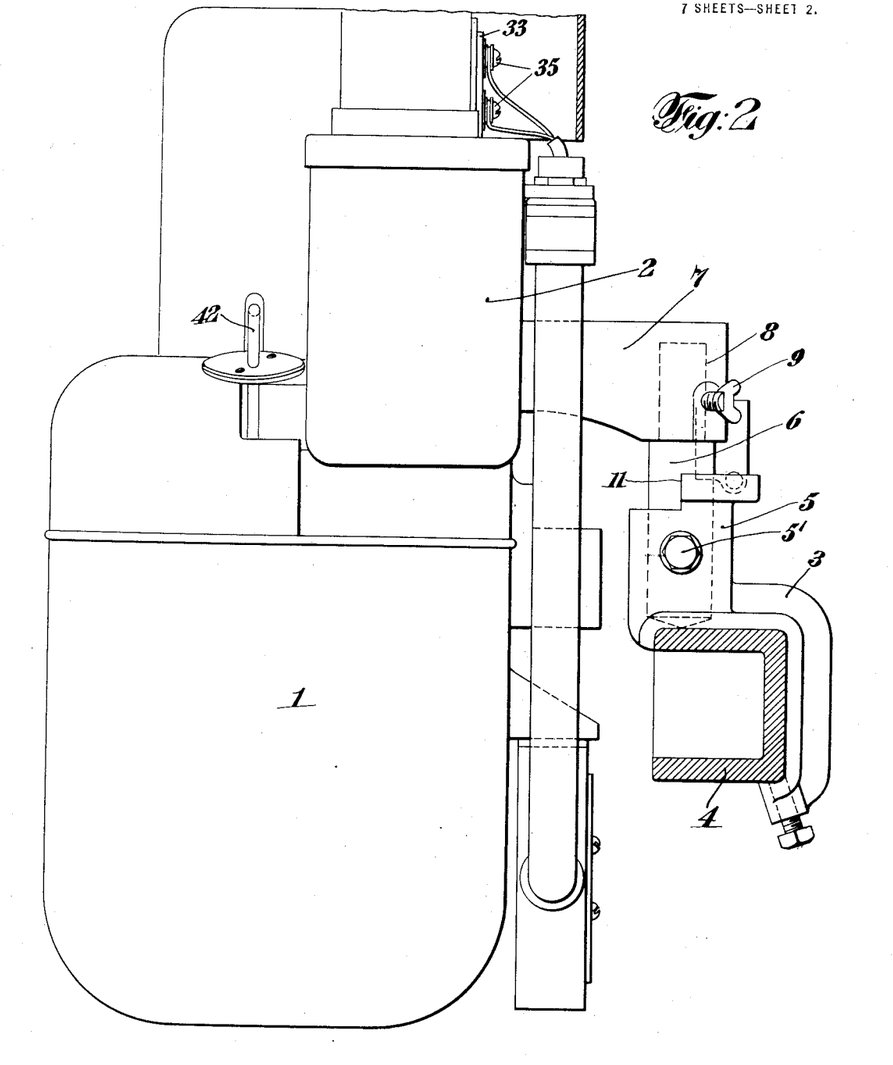
Fig. 2 is an enlarged rear elevation of the melting pot and associated feeder of Fig. 1.
Figure 3:
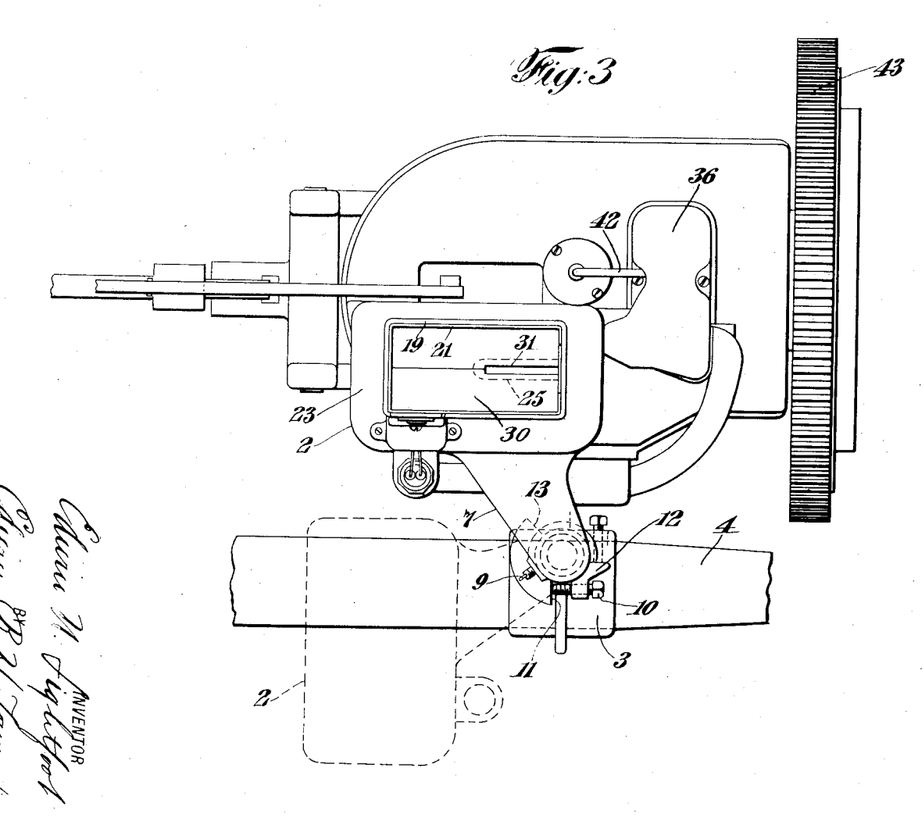
Fig. 3 is a top plan of the melting pot and associated feeder of Fig. 1, the dotted lines representing the inoperative position to which the feeder may be swung when desired.

Figs. 1 to 3 inclusive show the general outside appearance of the feeder and the manner in which it is associated with the linotype pot. The linotype pot is shown at 1 and may be of standard construction. The feeder is shown at 2. It is mounted to swing to and from a position directly over the opening in the top of the linotype pot in the following manner.

A bracket 3 is adapted to be clamped to a stationary portion 4 of the frame of the machine. This bracket has an upwardly extending socket 5 in which there is clamped the extremity of a stud 6 by a set-screw 5'. The feeder 2 has an extension 7 having an opening in which the upper extremity 8 (Fig. 2) of the stud 6 fits. The extension 7 is provided with a clamp screw 9 which may serve to hold the feeder in its operative or inoperative position. The extension 7 of the feeder carries a set screw 10, the extremity of which abuts against a shoulder 11 formed on the sleeve 5 of the bracket 3. The screw 10 abuts against this shoulder when the feeder is in its operative position over the linotype pot. This screw limits the swinging movement of the feeder as it moves to its operative position. By adjusting this screw 10 the feeder may be made to assume its proper position relative to the opening in the top of the linotype pot when the feeder is swung to its operative position. The movement of the feeder to its inoperative position is limited by a projection 12, also carried by the extension 7, which co-operates with a second shoulder 13 formed on the sleeve 5 of the bracket 3. The dotted lines in Fig. 3 indicate the position of the feeder when it is swung from its operative position over the linotype pot.

From the above described manner of supporting the feeder it will be noted that the feeder is supported on the frame work of the machine in operative relation with the linotype pot, but it is supported independently thereof. The linotype pot is therefore not subjected to the weight of the feeder.

The linotype pot which is of standard construction is similar to that shown in Fig. 1 of Patent No. 1,074,105 granted September 30, 1913 to P. T. Dodge, and is pivotally supported in a similar manner to permit oscillatory movement of the pot to and from casting position. Since the linotype pot is of well known construction, a detailed description thereof is considered unnecessary. It should be noted, however, that the metal in the linotype pot is heated by a pair of electric heaters 14 (Fig. 5) located in the pot and by the usual mouth and throat heaters 15 and 16 respectively. These heaters are of the well known type comprising thin metal plates between which an electric resistor is placed. The linotype pot is provided with a top, a portion of which is curved. The curvature of this portion is such that the feeder casing 18 may be positioned immediately above and in but slight spaced relation therefrom without interfering with the oscillation of the pot as it moves to and from casting position.

Figure 5:
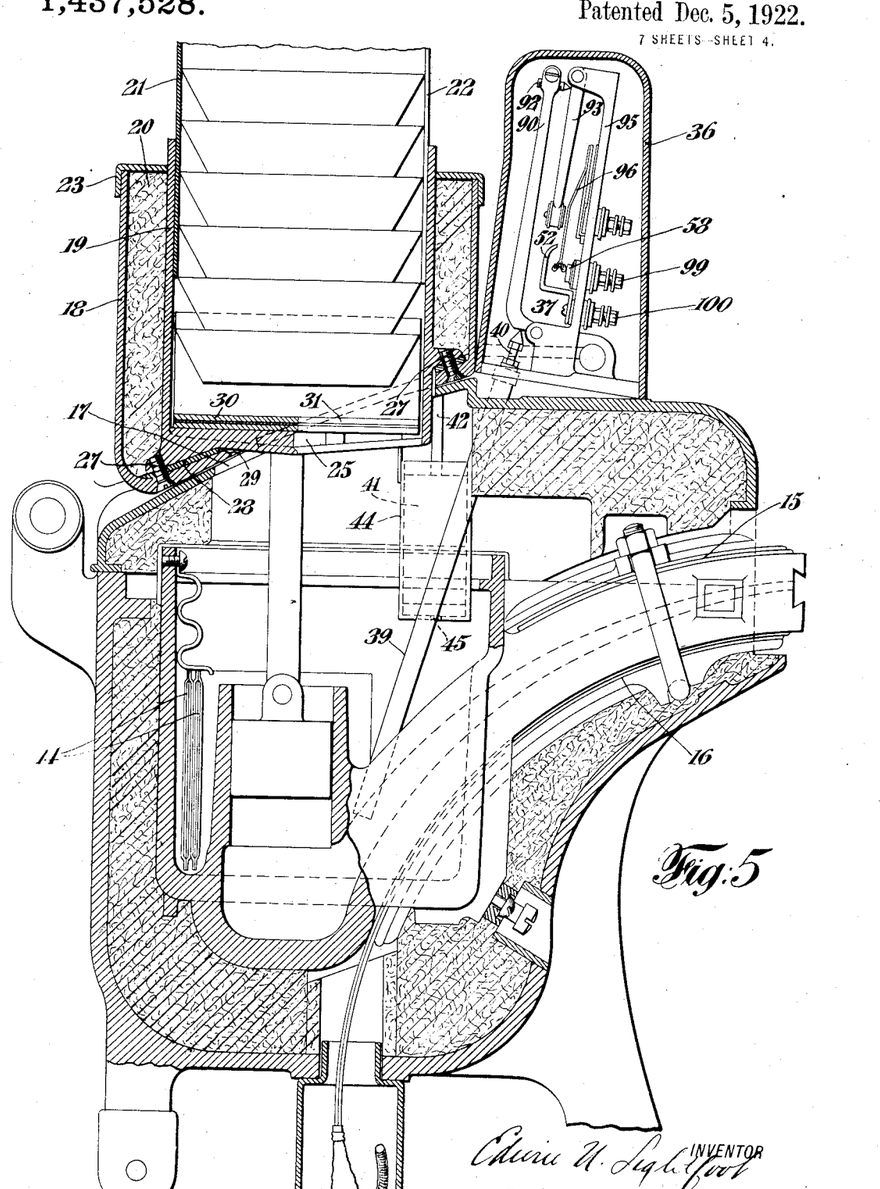
Fig. 5 is a vertical section through the melting pot and feeder.

The curved portion of the top of the linotype pot is provided with an opening 17. The feeder is adapted to swing to a position directly over this opening. The feeder itself comprises an outside casing 18, the bottom of which is inclined or curved so that it will fit over the curved portion of the top of the linotype pot as shown in Figs. 1 and 5. Since the bottom of the crucible casing 18 and the curved portion of the top of the linotype pot have like curvatures, as shown in Figures 1 and 5, the crucible casing may be mounted so close to the top of the pot as to form a substantial seal for the opening therein. The crucible mounted in this position does not interfere with the movement of the linotype pot to and from casting position, but serves to maintain a substantial seal for the opening in the top of the linotype pot during this movement. The maintenance of this substantial seal for the linotype pot opening prevents, to a large degree, the escape of heat and gases therefrom. The heat losses, the escape of obnoxious and sometimes dangerous gases from and the oxidation of the metal in the linotype pot is thus reduced. The crucible 19 of the feeder is constructed in a manner hereinafter described and is positioned in the casing 18. The crucible 19 is made smaller than the casing 18 to leave a space between the walls of the crucible and the walls of the casing. This space is packed with heat insulating material 20.

Figure 4:
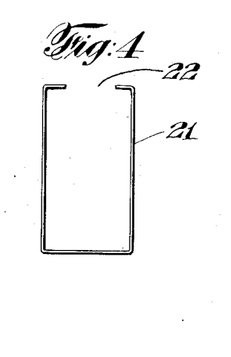
Fig. 4 is a plan of the chute employed for feeding the metal pigs to the feeder.

A sheet metal chute 21 is adapted to hold a stack of standard pigs and to deliver them by gravity to the crucible 19. The lower end of the chute 21 fits within the upper end of the crucible 19 as shown in Fig. 5. The chute 21 may be of any desired height to hold a sufficient number of pigs. As the lowermost pigs are melted the column of pigs descends by gravity. The cross section shape of the chute 21 will depend upon the shape of the pigs used. In the present instance it is made rectangular in cross section as shown in Fig. 4 to receive the rectangular pigs and is provided with an opening 22 at one side through which the pigs may be inserted. This opening is of less width than the width of the standard pigs and in order to position the pigs in the chute it is necessary to tilt them. After the metal pigs are positioned in the chute they will, of course, be retained therein and fed downwardly in the crucible. The opening 22 in the chute obviates the necessity of dropping the pigs into the chute from the top. The top of the casing 18 of the feeder is closed by means of a cover 23. The upper end of the crucible 19 projects through an opening provided in this cover.

Figure 9:
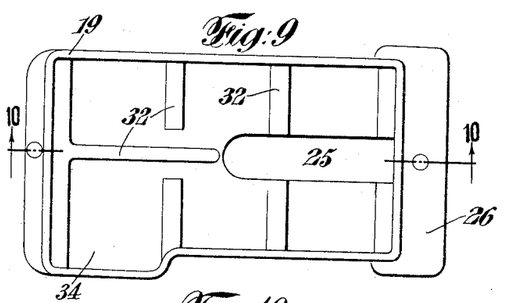
Fig. 9 is a plan of the crucible of the feeder.
Figure 10:
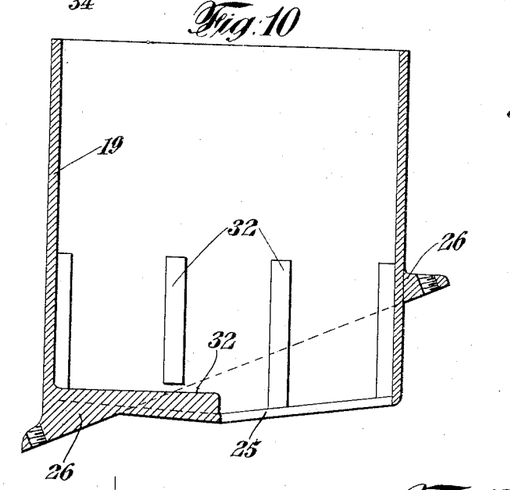
Fig. 10 is a vertical section on line 10—10 of Fig. 9.
Figure 11:
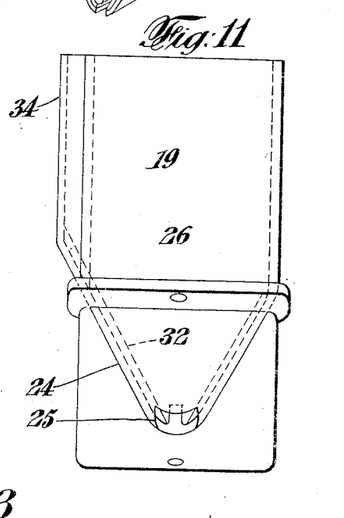
Fig. 11 is a front elevation of the crucible for the feeder.

The construction of the crucible itself is shown in Figs. 9 to 11 inclusive. The lower portion of the crucible is made trough shaped as shown at 24, a discharge opening 25 being provided at the lowest part of the crucible. A flange 26 is associated with the lower portion of the crucible and this flange is so formed and so inclined that it will rest upon the inclined bottom of the casing 18. This flange is adapted to be screwed to the bottom of the casing 18 by means of the screws 27 (Fig. 5). A sheet of heat insulating material 28 is preferably interposed between the bottom of the casing 18 and the flange 26 of the crucible. When the crucible is positioned in the casing 18 a portion of the V shaped bottom of the crucible projects through an opening 29 in the bottom of the casing 18 as shown in Fig. 5.

Figure 12:
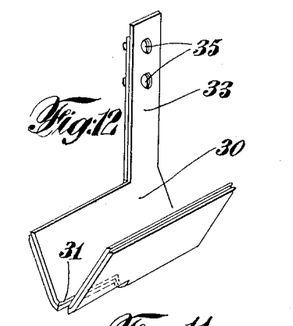
Fig. 12 is a perspective of the electric heater for the crucible.

The electric heater 30 for the feeder is shown in Fig. 12. It may comprise a pair of thin metallic plates between which an electric resistor is positioned. The heater is trough shaped as shown so that it will fit into the trough shaped bottom of the crucible. The heater 30 is provided with a discharge opening 31 which, when the heater is positioned in the crucible, is adapted to overlie the discharge opening 25 in the crucible. As the heater 30 melts metal from the lowermost pig or pigs the molten metal flows through the discharge opening 31 directly into the linotype pot. The discharge of metal therefore takes place from the heater itself and the melted metal does not come in contact with any relatively cool part which would tend to congeal the metal. There is therefore no tendency of the metal to congeal and clog the discharge opening of the feeder, as the metal is discharged directly from the opening 31 in the heater and this opening is, of course, kept clear by the heat from the heater. The inner surface of the bottom of the crucible is provided with a series of ribs 32 upon which the heater 30 rests. The heater is, therefore, spaced a small distance from the bottom of the crucible. If the bottom pig should not melt sufficiently clear and thus tend to flood the feeder, or if the feeder should tend to flood for any other reason the molten metal, when it reaches the top of the heater will flow over the edge of the heater and downwardly through the space between the walls of the heater and crucible. The molten metal in the feeder cannot, therefore, rise higher than the upper edge of the heater.

When the heater 30 is positioned in the crucible the terminal arm 33 of the heater projects upwardly through a bulge or enlargement 34 formed on the side of the crucible. The electric wires for supplying current to the heater are connected to the terminals 35 of the heater as shown in Fig. 1. The upper end of the arm 33 of the heater extends upwardly through the cover 23 of the feeder to a point where the terminals 35 are accessible.

Figure 6:
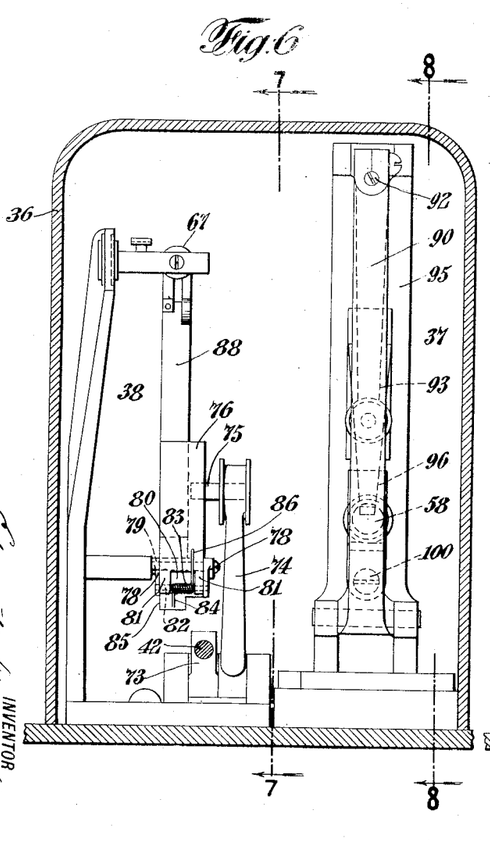
Fig. 6 is a vertical section through the switch housing showing the switch for controlling the supply of current to the heater of the feeder, and also showing the switch for controlling the supply of current to the heaters of the melting pot.
Figure 7:
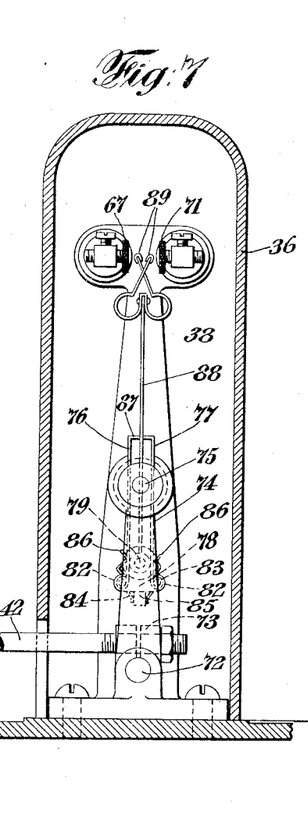
Fig. 7 is a vertical section on line 7—7 of Fig. 6.
Figure 8:
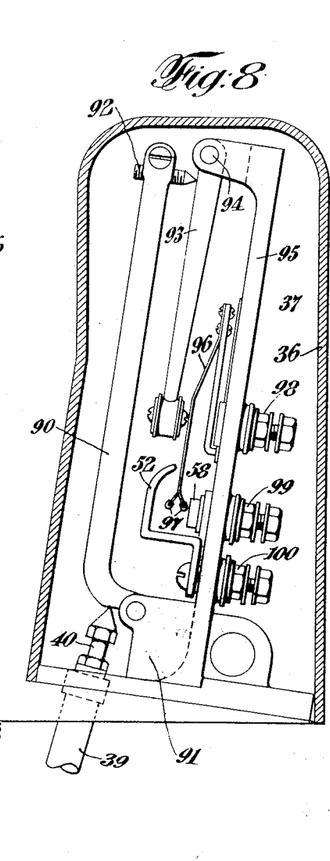
Fig. 8 is a vertical section on line 8—8 of Fig. 6.

The switches for controlling the supply of current to the heaters of the linotype pot and the heater of the feeder are illustrated in Figs. 6 to 8 inclusive. Both switches are positioned in a casing 36 supported on the top of the linotype pot adjacent the feeder as shown in Fig. 5.

The switch for controlling the supply of current for the heaters of the linotype pot is thermostatically controlled. The switch for controlling the supply of current to the heater of the feeder is controlled by a float located in the linotype pot. The thermostatically controlled switch of the linotype pot heaters is indicated in general at 37 and the switch for controlling the supply of current to the heater of the feeder is indicated in general at 38. The switch 37 is actuated by a thermostat which may comprise a metal tube 39 (Fig. 5) extending downwardly into the linotype pot and a rod 40 positioned in this tube. Relative expansion and contraction between the rod 40 and the tube 39 serves to actuate the switch 37 in the manner hereinafter described.

The switch 38 for controlling the supply of current to the heater of the feeder is controlled by a float 41 which rises and falls with the rise and fall of the molten metal in the linotype pot. The float 41 is connected to a rod 42 which extends upwardly through the top of the linotype pot as shown in Fig. 2. At a point above the top of the linotype pot the rod 42 is bent so that it projects into the casing 36 where it is connected to the switch 38 in the manner shown in Fig. 7. In a linotype machine the linotype pot is periodically tilted to and from casting position relative to the mold wheel shown at 43. As the linotype pot tilts, the molten metal therein washes back and forth. This causes a slight fluctuation in the level of the metal in the pot at the point where the float 41 is located. This fluctuation in the level of the metal should obviously not be allowed to actuate the float 41. The float 41 is therefore positioned in a casing 44 which communicates with the interior of the linotype pot through a restricted opening 45. This opening permits the metal in the linotype pot to normally assume the same height in the casing 44 as in the linotype pot itself, but serves to dampen fluctuations of the level of the metal in the float casing 44 when the linotype pot tilts. The restricted opening 45 throttles the passage of molten metal to and from the casing 44 so that as the linotype pot tilts the level of the metal in the float casing 44 does not have time to change sufficiently to materially change the position of the float 41.

Figure 13:
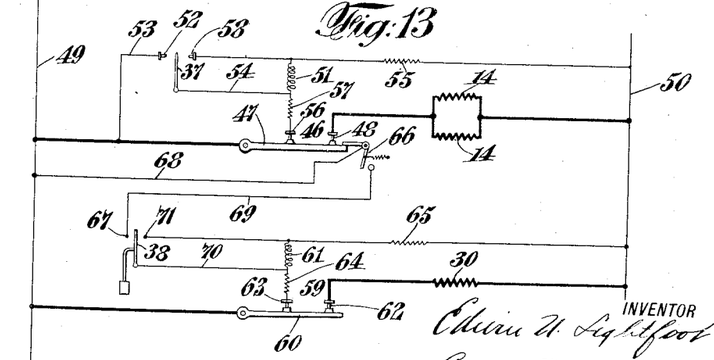
Fig. 13 is a wiring diagram of the electrical connections between the switches and the electric heaters.
Figures 14, 15:
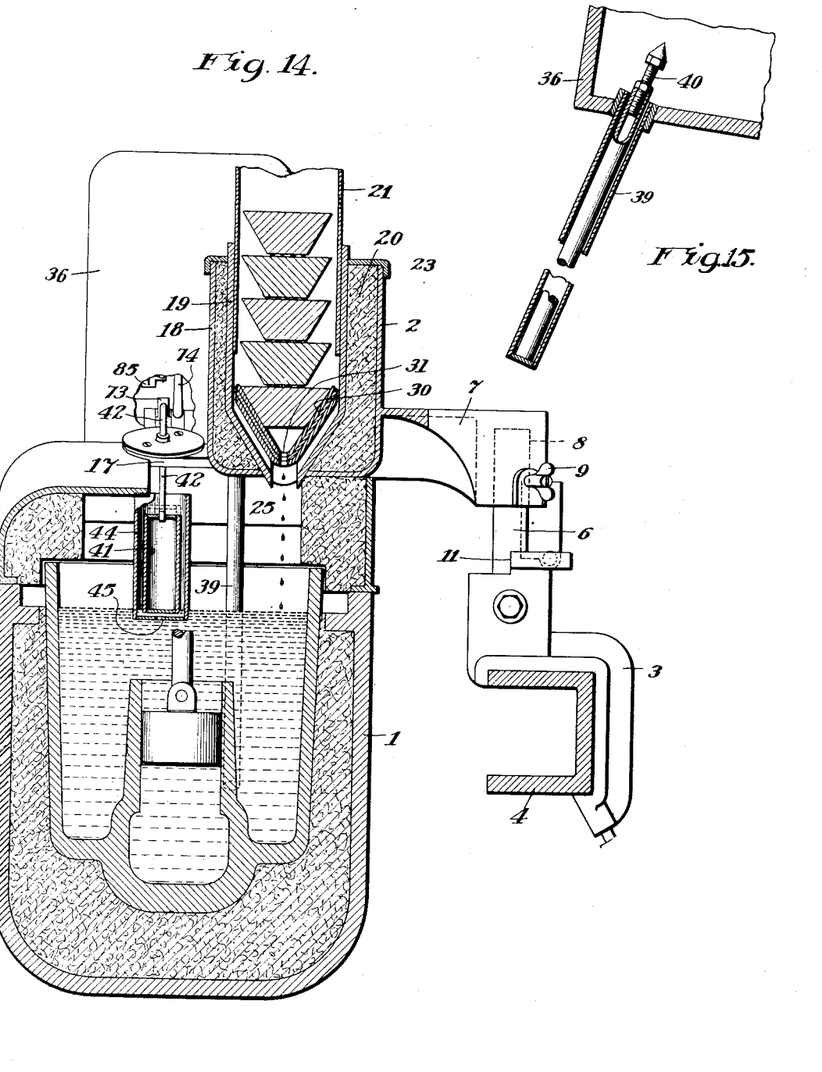
Fig. 14 is a vertical section through the melting pot and feeder at substantially right angles to the section shown in Fig. 5.
Fig. 15 is a vertical section through the thermostat controlling the switch in the melting pot heater circuit.

The detail construction of the switches 37 and 38 will be explained after their function is described in connection with the wiring diagram shown in Fig. 13. It is desirable that the contacts of these switches should not be subjected to the full current supplied to the heaters. The switches 37 and 38 therefore serve as relays to control magnet switches which in turn control the supply of current to the heaters. The magnet switches are diagrammatically represented in Fig. 13 and the manner in which the switches 37 and 38 control these switches will be clear from this figure. In Fig. 13 the switches 37 and 38 are diagrammatically represented and the heaters for the linotype pot and for the feeder are also diagrammatically represented. These parts are all indicated by the same reference characters as used in the other figures.

The magnet switch controlled by the thermostat switch 37 is shown at 46. It comprises an arm 47 adapted to complete a circuit through the heater units 14 of the linotype pot when it is in engagement with the contact 48. When the arm 47 is in engagement with the contact 48 the path of the current is as follows: from one supply main 49 through arm 47, contact 48, heater units 14, to the supply main 50. The arm 47 is actuated by a magnet coil 51. When the arm of the switch 37 is in engagement with the contact 52 a circuit is completed through the conductor 53, switch 37, conductor 54, coil 51, resistance 55 to the supply main 50. The resistance 55 is provided to reduce the voltage applied to the coil 51. When this circuit is completed energization of the coil 51 attracts the switch arm 47 and completes a circuit through the heater units 14. When the switch arm 47 is attracted by the coil 51 it engages a second contact 56 and a retaining circuit is thus established from the arm 47 through a resistance 57, coil 51, resistance 55 to the supply main 50. The arm 47 will remain in its operative position until the arm of the thermostat switch 37 engages contact 58. This will short circuit the coil 51 thus de-energizing the coil and permitting the switch arm 47 to open. Therefore when the temperature of the metal in the linotype pot falls below a predetermined value the arm of the thermostat switch 37 engages the contact 52 and causes the magnet switch to complete a circuit through the heater units of the linotype pot. When the metal in the pot is heated to the proper degree the arm of the thermostat switch 37 engages the contact 58 thus causing the magnet switch to open and break the circuit through the heater units of the linotype pot.

A similar magnet switch 59 is provided for controlling the supply of current to the heater 30 of the feeder. When the arm 60 of the switch is attracted by the coil 61 it engages a contact 62 and a circuit is then completed from the supply main 49, through arm 60, contact 62, heater 30 to the supply main 50. The arm 60 also engages a contact 63 to establish a retaining circuit through the resistance 64, coil 61, resistance 65 to the supply main 50. The energization of the coil 61 is controlled by the float switch 38. However, the float switch 38 will energize the coil 61 of the magnet switch only in case the magnet switch 46 is open. If the magnet switch 46 is open a lock switch 66 controlled by this magnet switch is closed and then a circuit is completed to the contact 67 of the float switch through conductors 68 and 69. Therefore, if the lock switch 66 is closed and the level of the metal in the linotype pot falls the arm of the float switch 38 when it engages the contact 67 will complete a circuit through the conductors 68 and 69, contact 67, conductor 70, coil 61, resistance 65 to the supply main 50. This will energize the coil 61 and actuate the magnet switch 59 and complete the circuit through the heater of the feeder. If the magnet switch 46 happens to be closed the lock switch 66 will be open and therefore when the arm of the float switch 38 engages the contact 67 the coil 61 will not be energized. When the arm of the float switch 38 engages the contact 71 the coil 61 of the magnet switch 59 will be short circuited thus allowing the magnet switch to open and break the circuit of the heater 30. It will now be seen that if the magnet switch 46 is closed and a circuit is completed through the heater units of the linotype pot the magnet switch for controlling the current to the heater of the feeder cannot be closed. This is to prevent flooding of the melting pot and waste of current when the machine is first started in operation. When the machine is first set in operation it takes about fifty or sixty minutes to melt the metal in the linotype pot. During this operation it is not necessary to feed metal to the linotype pot and therefore it is undesirable to cause the heater of the feeder to operate during this period. This would merely result in a waste of current and an unnecessary melting of the metal in the feeder. Furthermore if the feeder operated during this period it might flood the melting pot because the solid metal in the pot would interfere with the operation of the float mechanism. As the two magnet switches are interlocked so that the magnet switch for controlling the supply of current to the heater of the feeder cannot close when the magnet switch for the heaters of the linotype pot is closed, it is obvious that when current is being supplied to the linotype pot heaters, during the preliminary operation, the heater of the feeder will be rendered inoperative. This feature of interlocking the magnet switches is not objectionable during the normal operation of the machine because current is supplied to the linotype pot heaters for relatively short periods only and therefore it makes no difference if the feeder is rendered inoperative during these short intervals.

The detail construction of the switches 37 and 38 is shown in Figs. 6 to 8 inclusive. These switches may, of course, be of any suitable construction. The rod 42 which is connected to the float 41 projects into the casing 36 and is there connected to a rock shaft 72 by means of a clamp 73. The rock shaft 72 carries an upwardly extending arm 74. As the rod 42 is actuated it causes the arm 74 to oscillate about the axis of the shaft 72. The arm 74 carries a pin 75 which engages between two spring pressed fingers 76 and 77. These fingers are mounted at their lower ends upon a support 78 which is pivotally carried by a pin 79. As shown in Fig. 6 the lower ends of the fingers 76 and 77 are bifurcated resulting in a central space 80 and two small arms 81. The arms 81 of each of the fingers are pivoted to a pin 82 carried by the support 78. A coil spring 83 is positioned on each pin 82. One end 84 of the spring 83 bears against a downward extension 85 on the support 78, and the other end 86 of said spring bears against the corresponding finger. In this way the two fingers 76 and 77 are yieldingly urged toward each other and yieldingly held in a central position. The upper ends of the fingers 76 and 77 are bent inwardly as shown at 87. A contact arm 88 is rigidly secured to the support 78 and extends upwardly between the two fingers 76 and 77. It is engaged on opposite sides by the bent extremities 87 of the fingers. The upper end of the arm 88 carries contacts 89. When the contact arm 88 swings to the right or left it brings either of the contacts 89 into engagement with either the contact 67 or 71. The contacts 67 and 71 correspond with the contacts in Fig. 13 represented by these same reference numerals. As the arm 42 is actuated the pin 75 in swinging either to the right or the left tilts the support 78 the fingers 76 and 77 and the contact arm 88. After the movement of the arm 88 is arrested by coming into engagement with one of the contacts 67 or 71 the spring finger which is being pushed by the pin 75 moves away from the arm 88. The pin 75 can therefore continue to move after the movement of the arm 88 is arrested because this continued movement of the pin will merely serve to shift that finger which is in engagement with the pin 75 further from the arm 88. This permits an extensive movement of the pin 75 in either direction without doing any harm to the parts of the switch after the contact is established.

The switch 37 comprises an arm 90 (Figs. 6 and 8) pivoted at its lower end to a stationary support 91. The extremity of the thermostat rod 40 engages with the arm 90 near the point at which it is pivoted. The tube 39 is secured to the support 91, therefore the expansion and contraction of the rod 40 relative to the tube 39 serves to rock the arm 90. The upper end of the arm 90 carries an adjustable pin 92 which bears upon an arm 93 which is pivoted at 94 to the upper end of the stationary support 95. The pin 92 engages with the arm 93 near the pivot 94. The lower end of the arm 93 bears against a spring finger 96 which carries a pair of contacts 97. The contacts 97 are adapted to engage, in one position of the finger 96, with the contact 52, and in another position of the spring finger 96 with the contact 58. The contacts 52 and 58 correspond with the contacts represented by the same numerals in Fig. 13. The conductor 54 shown in Fig. 13 is electrically connected to the spring finger 96 at the terminal 98. Similar terminals 99 and 100 permit the contacts 52 and 58 to be electrically connected to the proper conductors diagrammatically represented in Fig. 13. It will now be noted that slight movements of the thermostat rod 40 are amplified by the arms 90 and 93 and serve to actuate the spring finger 96 to move one of the contacts 97 into engagement with contact 52 or contact 58. When the machine is in operation and the level of the metal in the linotype pot falls below a predetermined point the float 41 actuates the relay switch 38 and this switch in turn actuates the magnet switch 59 to supply current to the heater of the feeder provided that the magnet switch for the linotype pot heater is not already closed. This will serve to melt metal from the lowermost pig or pigs in the crucible 19 and the melted metal will flow into the bottom of the trough shaped heater and then into the linotype pot in substantially a continuous stream. When the metal in the linotype pot is restored to its proper level the supply of current to the heater of the feeder is cut off. As the metal is introduced into the linotype pot in a heated condition it does not chill the molten metal in the linotype pot. This minimizes fluctuations in the temperature of the metal in the linotype pot thus permitting the thermostat to be made less sensitive and very rugged in construction.

An important point in any melting device where the metal drips off a lip or spout is to prevent the metal from clogging at the discharge point. The temperature of the lip or spout must be sufficiently high to keep the metal fluid. If the discharge point is much too low in temperature, the metal will solidify and accumulate and gradually cut off the discharge of metal. Or if the metal is not completely solidified it may become viscous and be discharged at a slower rate than it is melted thus causing flooding. In order to obviate the above tendencies it has heretofore been necessary to apply heat to the lip or spout by means of an auxiliary heater. In the present instance the metal is discharged through an opening in the heater itself and therefore no auxiliary heating means is necessary to prevent solidifying or thickening of the metal.

The heat in the feeder is well conserved as the heater is spaced from the walls of the crucible by the ribs formed in the bottom of the crucible and the crucible itself is spaced from the walls of the outside casing 18 and surrounded by heat insulating material. The heat is further conserved due to the fact that the feeder is adapted to receive standard metal pigs which are usually rough and in some instances provided with raised figures or letters. The pigs themselves are therefore slightly spaced apart and provide a poor conducting path for the heat. The heat is therefore concentrated at the lowermost pigs. This, of course, quickens the response to the heater and also makes it possible to terminate the heat insulating material at the place shown instead of applying it to the full length of the stack of pigs.

The feeder is adapted to receive standard pigs and therefore it is not necessary to first have the metal cast into special ingots.

The improved feeding mechanism may be used in combination with any kind of a melting pot utilizing any kind of a heater. Furthermore so far as certain phases of the invention are concerned it is immaterial whether the heater in the feeder is an electric heater or a heater of a different type such as a gas heater.

The apparatus has been described in detail merely for illustrative purposes and it will be understood that various changes may be made without departing from the scope of the invention as defined in the accompanying claims.

What I claim is:

1. A feeder for feeding metal into an oscillatory melting pot provided with a curved top, comprising a relatively stationary crucible for holding the metal to be fed to the pot, the casing of the crucible being curved to conform to the shape of the melting pot top.

2. A feeder for feeding metal to melting pots comprising electrical means for heating said metal, a relay controlled by the level of the molten metal in the pot, and a magnet switch controlled by the relay for controlling the supply of current to the heating means.

3. A feeder for feeding melted metal to melting pots comprising means for holding above the pot a stack of metal pigs arranged one above the other, electrical means for heating the lowermost pig, and an electromagnetic switch controlled by the level of the metal in the pot and governing the operation of the electric heating means.

4. A feeder for melting pots comprising means adapted to hold a stack of metal pigs above the pot, and an electric trough shaped heater adapted to heat the lowermost pig.

5. A feeder for melting pots comprising means adapted to hold solid metal above the pot, and an electric trough shaped heater adapted to heat said metal.

6. A feeder for melting pots comprising means for holding solid metal above the pot, and an electric trough shaped heater controlled by the level of the metal in the pot for heating said solid metal.

7. A feeder for melting pots comprising a crucible for holding metal to be fed to the pot and a heater associated with the crucible for melting a portion of the metal and for receiving and conducting the metal thus melted to the pot.

8. A feeder for type casting machines and the like comprising a crucible, and a heater for melting metal in said crucible, and for discharging the melted metal from an edge of the heater.

9. A feeder for type casting machines and the like, comprising a crucible and a heater therein for melting metal, the heater being arranged to support the metal and having an opening through which the melted metal is discharged.

10. A feeder for melting pots comprising a crucible for holding metal to be fed to the pot, and a heater associated with said crucible for melting a portion of said metal and to receive the metal thus melted, to conduct and discharge the melted metal directly into the pot.

11. A feeder for melting pots comprising a crucible adapted to receive metal to be melted, and an electric heater removably positioned in said crucible, said electric heater having a discharge opening adapted to discharge the melted metal directly into the pot without contacting with the crucible.

12. A feeder for melting pots comprising a crucible for holding metal to be fed to the melting pot, and a trough shaped heater for melting said metal, and conducting and discharging the melted metal directly into the melting pot.

13. A feeder for melting pots comprising a crucible for holding metal to be fed to the melting pot and a trough shaped heater for melting said metal, and having an opening through which the melted metal is discharged directly into the melting pot.

14. A feeder for a melting pot comprising a crucible for holding solid metal to be melted and having a discharge opening therein, and a removable electric heater positioned in the crucible and provided with a discharge opening so disposed with respect to the crucible opening that the melted metal is discharged directly from an edge of the heater opening through the crucible opening and into the melting pot without the aid of any guide other than the heater opening itself.

15. A feeder for melting pots comprising a crucible, a trough shaped heating element positioned therein and means to space said heating element from the bottom of the crucible.

16. A feeder for melting pots comprising a crucible having a discharge opening in the bottom thereof, a trough-shaped heating element positioned in said crucible, and means to space said heating element from the bottom of the crucible.

17. A feeder for melting pots comprising a crucible having a trough-shaped bottom with a discharge opening and a trough-shaped heating element positioned in said crucible and spaced from the bottom thereof.

18. A feeder for melting pots comprising a crucible having a trough-shaped bottom with a discharge opening, and a trough-shaped heating element positioned in said crucible and having a discharge opening overlying the discharge opening in the crucible.

19. A feeder for melting pots comprising a crucible having a trough-shaped bottom with a discharge opening, and a trough-shaped heating element positioned in said crucible and spaced from the bottom thereof, said heating element having a discharge opening overlying the discharge opening in the crucible.

20. In a type casting machine a tiltable melting pot, means for feeding metal thereto, heating means for heating the metal in the feeding means, a float in the melting pot for controlling the supply of heat to said heating means, and means for reducing the tendency for the float to be actuated when the melting pot is tilted.

21. In a type casting machine a tiltable melting pot, means for feeding metal thereto, heating means for heating the metal in the feeding means, a float in the melting pot for controlling the supply of heat to said heating means, and a casing enclosing said float and in communication with the interior of the melting pot by means of a restricted opening.

22. In a type casting machine, or the like, the combination with a tiltable melting pot of a float therein, and means to reduce the tendency of the float to be actuated when the melting pot is tilted.

23. A feeder for melting pots comprising a crucible positioned above the melting pot, means for holding a stack of metal pigs and directing them into the crucible, an electric heater in the crucible, a casing enclosing said crucible and heat insulating material interposed between the crucible and said casing.

24. A feeder for melting pots comprising a crucible positioned above the melting pot, means for holding a stack of metal pigs and directing them into the crucible, an electric heater in the crucible and spaced from the walls thereof, a casing enclosing said crucible and heat insulating material interposed between the crucible and said casing.

25. In a type casting machine, a melting pot, a heater therefor, thermostatically controlled means for controlling the supply of heat to said heater, a supplemental heater for heating metal to be fed to the pot, means for automatically controlling the supply of heat to said supplemental heater and means whereby heat cannot be supplied by the supplemental heater when it is being supplied by said first named heater.

26. In a type casting machine, a melting pot, a heater therefor, a feeder, a supplemental heater for heating metal in said feeder, and means for automatically rendering the supplemental heater inoperative when the first named heater is in operation.

27. In a type casting machine a melting pot, an electric heater therefor, a feeder, an electric heater for the feeder, and means for preventing current from being supplied to the heater of the feeder when it is being supplied to the heater of the melting pot.

28. In a type casting machine a melting pot, an electric heater therefor, a switch for controlling the supply of current to said heater, a feeder, a supplemental electric heater for said feeder, a switch for controlling the supply of current to said supplemental heater, and an interlock between said switches.

29. A feeder for feeding metal into an oscillatory melting pot comprising a relatively stationary crucible for holding metal to be fed to the pot, the casing of the crucible conforming to the shape of the melting pot top to permit the crucible to be mounted in a position in close proximity to the melting pot without interference with the movement thereof to and from casting position.

30. A feeder for melting pots comprising a crucible and a heater removably positioned in the crucible and supporting the metal to be melted thereby.

31. A feeder for feeding metal into a melting pot, provided with an opening in the top comprising a crucible for holding metal to be fed to the pot, the casing of the crucible conforming to the shape of the melting pot top to permit the crucible to be positioned in such close proximity to the melting pot so as to form for the opening a cover which does not interfere with the movement of the pot to and from casting position.

32. A feeder for melting pots of type casting machines and the like comprising a crucible and a removable heater adapted to melt metal in the crucible by direct contact with the metal.

33. A feeder for a melting pot provided with an opening, comprising a crucible for holding metal to be fed to the pot, the casing of the crucible being curved to conform to the shape of the melting pot so as to form for the opening a cover maintained in covering relation thereto during the movement of the pot to and from casting position.

34. A feeder for melting pots comprising a crucible and a removable electric heater in said crucible upon which rests the metal to be melted in the crucible.

35. A feeder for feeding metal into an oscillatory melting pot provided with an opening comprising a crucible for holding metal to be fed to the pot, the casing of the crucible conforming to the shape of the melting pot top so as to form a cover for the opening through which metal is fed into the pot from the crucible.

36. A feeder for melting pots comprising a crucible and a removable electric heater positioned therein.

37. A feeder for melting pots comprising a crucible and a removable electric heater positioned therein and arranged to contact directly with the metal to be melted thereby.

38. A feeder for a melting pot comprising a crucible and an electric heater positioned therein and provided with an insulated resistor in thermal contact with an enclosing armor and adapted to melt metal in the crucible by direct thermal contact with the metal.

39. A feeder for a melting pot having in combination, a crucible and an electric heater provided with an insulated resistor in thermal contact with an enclosing armor, said heater being adapted to melt metal in the crucible by direct thermal contact with the metal.

In witness whereof, I have hereunto subscribed my name.

EDWIN N. LIGHTFOOT.